United States Patent
Chhabra et al.

(10) Patent No.: US 11,126,566 B2
(45) Date of Patent: Sep. 21, 2021

(54) METHOD AND APPARATUS FOR SHARING SECURITY METADATA MEMORY SPACE

(71) Applicant: Intel Corporation, Santa Clara, CA (US)

(72) Inventors: Siddhartha Chhabra, Portland, OR (US); David M. Durham, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/690,614

(22) Filed: Nov. 21, 2019

(65) Prior Publication Data
US 2020/0183861 A1 Jun. 11, 2020

Related U.S. Application Data

(63) Continuation of application No. 15/282,575, filed on Sep. 30, 2016, now Pat. No. 10,528,485.

(51) Int. Cl.
*G06F 12/14* (2006.01)
*G06F 21/64* (2013.01)
(Continued)

(52) U.S. Cl.
CPC ...... *G06F 12/1408* (2013.01); *G06F 12/1425* (2013.01); *G06F 21/53* (2013.01);
(Continued)

(58) Field of Classification Search
CPC .......... G06F 12/14; G06F 11/30; G06F 15/14; G06F 7/04; G06F 21/53; G06F 21/64;
(Continued)

(56) References Cited

U.S. PATENT DOCUMENTS 6,138,230 A 10/2000 Hervin et al.
8,099,636 B2 1/2012 Tilton et al.
(Continued)

FOREIGN PATENT DOCUMENTS

KR 1020160085884 A 7/2016
TW 201112853 A 4/2011
(Continued)

OTHER PUBLICATIONS

Elbaz, Reouven, et al.; "TEC-Tree: A Low-Cost, Parallelizable Tree for Efficient Defense Against Memory Replay Attacks," Springer-Verlag, 2007, pp. 289-302.
(Continued)

*Primary Examiner* — Thanhnga B Truong
(74) *Attorney, Agent, or Firm* — Alliance IP, LLC

(57) ABSTRACT

The presently disclosed method and apparatus for sharing security metadata memory space proposes a technique to allow metadata sharing two different encryption techniques. A section of memory encrypted using a first type of encryption and having first security metadata associated therewith is converted to a section of memory encrypted using a second type of encryption and having second security metadata associated therewith. At least a portion of said first security metadata shares a memory space with at least a portion of said second security metadata for a same section of memory.

21 Claims, 8 Drawing Sheets

(51) Int. Cl.
*G06F 21/79* (2013.01)
*G06F 21/53* (2013.01)
*G06F 21/60* (2013.01)
*H04L 9/06* (2006.01)

(52) U.S. Cl.
CPC ............ *G06F 21/602* (2013.01); *G06F 21/64* (2013.01); *G06F 21/79* (2013.01); *H04L 9/0643* (2013.01); *G06F 2212/1052* (2013.01)

(58) Field of Classification Search
CPC .......... G06F 21/79; G06F 21/60; G06F 12/00; G06F 21/575; G06F 21/72; G06F 16/10; G06F 21/602; G06F 12/1408; G06F 12/1425; H04L 9/06; H04L 9/0643
See application file for complete search history.

(56) References Cited

U.S. PATENT DOCUMENTS

| | | | |
|---|---|---|---|
| 8,171,309 | B1 | 5/2012 | Poo et al. |
| 8,732,480 | B2 | 5/2014 | Hashimoto et al. |
| 8,751,828 | B1 | 6/2014 | Raizen et al. |
| 9,053,346 | B2 | 6/2015 | Chhabra et al. |
| 9,098,542 | B2* | 8/2015 | Prahlad ............... G06F 11/1451 |
| 9,432,183 | B1 | 8/2016 | Axnix et al. |
| 9,798,900 | B2 | 10/2017 | Oh et al. |
| 10,228,852 | B1 | 3/2019 | Volpe et al. |
| 2002/0169942 | A1 | 11/2002 | Sugimoto |
| 2003/0044007 | A1 | 3/2003 | Matthews |
| 2004/0034785 | A1 | 2/2004 | Tai et al. |
| 2004/0213370 | A1 | 10/2004 | Smallwood et al. |
| 2005/0251623 | A1 | 11/2005 | Arimilli et al. |
| 2005/0288925 | A1 | 12/2005 | Liardet et al. |
| 2006/0005047 | A1 | 1/2006 | Lekatsas et al. |
| 2006/0028880 | A1 | 2/2006 | Mikami et al. |
| 2006/0107047 | A1 | 5/2006 | Bar-El |
| 2006/0190996 | A1 | 8/2006 | Korkishko et al. |
| 2006/0277395 | A1 | 12/2006 | Fowles |
| 2007/0011421 | A1 | 1/2007 | Keller et al. |
| 2007/0130470 | A1* | 6/2007 | Blom ..................... G06F 21/86 713/181 |
| 2007/0180272 | A1 | 8/2007 | Trezise et al. |
| 2008/0117679 | A1 | 5/2008 | Srinivasan et al. |
| 2008/0155271 | A1 | 6/2008 | Barck et al. |
| 2008/0250294 | A1 | 10/2008 | Ngo et al. |
| 2009/0019317 | A1 | 1/2009 | Quach et al. |
| 2009/0019551 | A1 | 1/2009 | Haga et al. |
| 2009/0086881 | A1 | 4/2009 | Yoon et al. |
| 2009/0113110 | A1 | 4/2009 | Chen et al. |
| 2009/0240919 | A1 | 9/2009 | Alexander et al. |
| 2010/0017660 | A1 | 1/2010 | Tilton et al. |
| 2010/0189064 | A1 | 7/2010 | Raveendran |
| 2010/0250965 | A1 | 9/2010 | Olson et al. |
| 2010/0332716 | A1 | 12/2010 | Sheaffer et al. |
| 2011/0055489 | A1 | 3/2011 | Reddy et al. |
| 2011/0072242 | A1 | 3/2011 | Lee et al. |
| 2011/0110519 | A1 | 5/2011 | Suzaki et al. |
| 2011/0145482 | A1 | 6/2011 | Yu et al. |
| 2011/0289306 | A1 | 11/2011 | Khosravi et al. |
| 2012/0079283 | A1 | 3/2012 | Hashimoto et al. |
| 2012/0278635 | A1 | 11/2012 | Hars et al. |
| 2014/0040632 | A1 | 2/2014 | Chhabra et al. |
| 2014/0101461 | A1 | 4/2014 | Chhabra et al. |
| 2014/0208109 | A1 | 7/2014 | Trivedi et al. |
| 2014/0223197 | A1 | 8/2014 | Gueron et al. |
| 2015/0186295 | A1 | 7/2015 | Savagaonkar et al. |
| 2015/0293855 | A1 | 10/2015 | Gschwind et al. |
| 2015/0301957 | A1 | 10/2015 | Elias et al. |
| 2015/0349967 | A1 | 12/2015 | Chen et al. |
| 2015/0365355 | A1 | 12/2015 | Wang et al. |
| 2015/0370728 | A1 | 12/2015 | Yamada et al. |
| 2016/0098215 | A1 | 4/2016 | Song et al. |
| 2016/0170889 | A1 | 6/2016 | Lee et al. |
| 2016/0179702 | A1 | 6/2016 | Chhabra et al. |
| 2016/0275018 | A1 | 9/2016 | Chhabra et al. |
| 2016/0283748 | A1 | 9/2016 | Oh et al. |
| 2017/0083724 | A1* | 3/2017 | Chhabra ............. G06F 12/1408 |
| 2018/0011802 | A1* | 1/2018 | Ndu ..................... G06F 12/0891 |

FOREIGN PATENT DOCUMENTS

| | | |
|---|---|---|
| TW | 201116009 A | 5/2011 |
| WO | 2013100965 A1 | 7/2013 |
| WO | 2016148822 A1 | 9/2016 |
| WO | 2016153722 A1 | 9/2016 |
| WO | 2017052793 A1 | 3/2017 |

OTHER PUBLICATIONS

Final Office Action issued in U.S. Appl. No. 14/661,044 dated Sep. 29, 2016, 22 pages.
Final Office Action issued in U.S. Appl. No. 14/661,044, dated Nov. 15, 2017, 16 pages.
Final Office Action issued in U.S. Appl. No. 14/670,061, dated Jan. 25, 2017, 21 pages.
Final Office Action issued in U.S. Appl. No. 15/792,350 dated May 1, 2019, 21 pages.
Haifeng, Ma, et al.: "Memory Confidentiality and Integrity Protection Method Based on Variable Length Counter," Journal of Algorithms & Computational Technology, vol. 8, No. 4, Dec. 1, 2014, pp. 421-439.
International Preliminary Report on Patentability and Written Opinion issued in PCT Application No. PCT/2011/067590, dated Jul. 10, 2014, 5 pages.
International Preliminary Report on Patentability and Written Opinion issued in PCT Application No. PCT/US2016/018266, dated Sep. 19, 2017, 9 pages.
International Preliminary Report on Patentability and Written Opinion issued in PCT Application No. PCT/US2016/019890, dated Sep. 26, 2017, 8 pages.
International Preliminary Report on Patentability and Written Opinion issued in PCT Application No. PCT/US2017/049468, dated Apr. 11, 2019, 11 pages.
International Search Report and Written Opinion issued in PCT Application-No. PCT/US2011/067590, dated Aug. 27, 2012, 8 pages.
International Search Report and Written Opinion issued in PCT Application No. PCT/US2016/018266, dated Jun. 8, 2016, 13 pages.
International Search Report and Written Opinion issued in PCT Application No. PCT/US2016/019890, dated Jun. 1, 2016, 12 pages.
International Search Report and Written Opinion issued in PCT Application No. PCT/US2016/045408, dated Nov. 2, 2016, 14 pages.
International Search Report and Written Opinion issued in PCT Application No. PCT/US2017/049468, dated Dec. 12, 2017, 16 pages.
Notice of Allowance issued in European Patent Application No. 16765386.4, dated Dec. 20, 2018, 7 pages.
Notice of Allowance issued in U.S. Appl. No. 13/976,930, dated Feb. 9, 2015, 19 pages.
Notice of Allowance issued in U.S. Appl. No. 14/661,044 dated Sep. 10, 2018, 12 pages.
Notice of Allowance issued in U.S. Appl. No. 14/670,061, dated Jun. 26, 2017, 8 pages.
Notice of Allowance issued in U.S. Appl. No. 15/792,350 dated Sep. 20, 2019, 10 pages.
Office Action issued in U.S. Appl. No. 14/661,044 dated May 17, 2017, 15 pages.
Office Action issued in U.S. Appl. No. 14/661,044, dated Mar. 24, 2016, 20 pages.
Office Action issued in U.S. Appl. No. 14/670,061, dated Aug. 8, 2016, 18 pages.
Office Action issued in U.S. Appl. No. 14/863,353, dated Jun. 6, 2017, 12 pages.

(56) References Cited

OTHER PUBLICATIONS

Office Action issued in U.S. Appl. No. 15/792,350 dated Nov. 2, 2018, 20 pages.
Rogers, Brian, et al.: "Using Address Independent Seed Encryption and Bonsai Merkle Trees to Make Secure Processors OS-and Performance Friendly," 40th IEEE/ACM International Symposium on Microarchitecture, 2007, pp. 183-194.
Supplementary European Search Report issued in European Patent Application No. 16765386, dated Jul. 27, 2018, 5 pages.
Supplementary European Search Report issued in European Patent Application No. 16769280, dated Jul. 19, 2018, 8 pages.
Szefer, Jakub, et al.: "Towards Fast Hardware Memory Integrity Checking with Skewed Merkle Trees," ACM, Jun. 15, 2014, 8 pages.
Taiwanese Office Action and Search Report issued in Taiwanese Application No. 101149324, dated Feb. 11, 2015, with English translation, 12 pages.
Yan et al., "Improving Cost, Performance, and Security of Memory Encryption and Authentication," 2013 21st International Conference on Program Comprehension (ICPC); International Symposium on computer Architecture (ISCA), IEEE, US, Jun. 17, 2016, XP05829102, ISSN: 1063-6897, DOI: 10.1109/ISCA.2006.22, ISBN: 978/0/7695-3174-8, 12 pages.

\* cited by examiner

METHOD AND APPARATUS FOR SHARING SECURITY METADATA MEMORY SPACE

CROSS-REFERENCE TO RELATED APPLICATIONS

The present application is a continuation of U.S. application Ser. No. 15/282,575 filed on Sep. 30, 2016, the entire disclosure of which is incorporated herein by reference.

TECHNICAL FIELD

The present disclosure relates to a mechanism to allow metadata sharing between Memory Encryption Engine (MEE) and Total Memory Encryption with integrity (TMEi) to provide zero storage overhead integrity protections for TMEi.

BACKGROUND

Protection of memory in computer systems is of paramount importance. Memory can be encrypted to protect the confidentiality, integrity and replay of memory data. Sections of memory can be encrypted using different types of encryption. Each type of encryption includes its own respective security metadata. For example a section of memory, such as a page of memory, may be encrypted using a first type of encryption and having first security metadata associated therewith and stored in memory. The same section of memory may be encrypted using a second type of encryption having a second type of security metadata associated therewith and stored in memory. The amount of memory required to provide this protection of memory in terms of security metadata results in a large amount of memory being taken up by the protection mechanism.

By way of example, one mode of encryption is known as Total Memory Encryption with integrity (TMEi) which targets protecting the confidentiality and integrity of an entire platform memory. TMEi also finds usages in protection against software data corruption. In order for TMEi to provide integrity protections, it requires security metadata to be stored in memory.

By way of example, another mode of encryption is known as Software Guard eXtensions (SGX) and uses a Memory Encryption Engine (MEE) to protect a fixed region of memory. While other types of encryption may be used, the following example is for explanation purposes. With SGX and TMEi co-existent on the platform, assuming no optimizations to reduce storage overheads for MEE, the current platforms will reserve a large piece of the system memory for security metadata, a significant overhead for the security.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
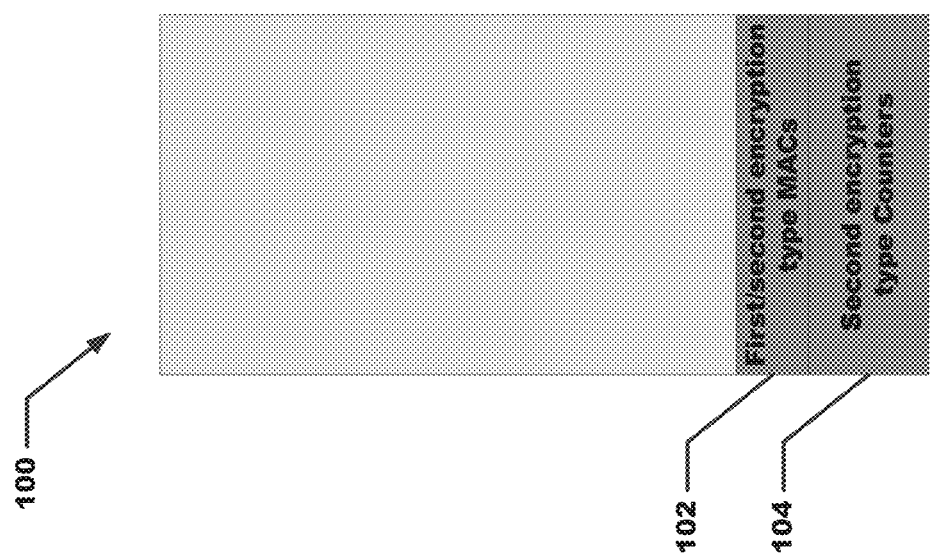
FIG. 1 illustrates a block diagram of metadata overheads with the presently disclosed method and apparatus for sharing security metadata memory space consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

The present disclosure is directed to a method and/or apparatus for sharing security metadata memory space. In one embodiment a method is configured to execute instructions for converting a section of memory from having been encrypted using a first type of encryption and having first security metadata associated therewith to a section of memory encrypted using a second type of encryption and having a second type of security metadata associated therewith. The method is further configured wherein at least a portion of the first security metadata shares a memory space with at least a portion of second security metadata for a same page of memory.

In another embodiment a computer system is configured to execute instructions for converting a section of memory from having been encrypted using a first type of encryption and having first security metadata associated therewith to a section of memory encrypted using a second type of encryption and having a second type of security metadata associated therewith. The computer system is further configured to execute instructions wherein at least a portion of the first security metadata shares a memory space with at least a portion of second security metadata for a same page of memory.

In another embodiment a computer readable storage device has stored thereon instructions that when executed by one or more processors result in the following operations. The instructions cause an operation of converting a section of memory from having been encrypted using a first type of encryption and having first security metadata associated therewith to a section of memory encrypted using a second type of encryption and having a second type of security metadata associated therewith. The computer readable storage device also includes instructions for causing the one or more processors to execute instructions wherein at least a portion of the first security metadata shares a memory space with at least a portion of second security metadata for a same page of memory.

As used herein "SGX" refers to Software Guard eXtensions (SGX) and is used to provide protections in the core to isolate SGX enclaves (SGX protected portions of an application) and protections in the uncore to protect the confidentiality, integrity, and replay of enclave data when resident in platform memory. SGX protects a fixed region of memory called the Enclave Page Cache (EPC) which is dedicated SGX memory stolen away from the Operating System (OS) for regular use. Enclave data protections in system memory are provided by the Memory Encryption Engine (MEE) which encrypts and integrity protects enclave data to the EPC as it moves off the processor chip. The security metadata maintained in memory by the MEE for providing security to enclave data is reserved at boot time and stolen from the OS.

As used herein "MEE" refers to an encryption technique which uses counter-mode encryption and counter-based Message Authentication Code (MAC) which form part of the security metadata stored in memory. The National Institute of Standards and Technology (NIST) specifies two types of counters. The first type of counter is a counter which is made up of a nonce and a counter. The nonce is random, and the remaining bytes are counter bytes (which are incremented). The second type of counter is a counter block, where all bytes are counter bytes and can be incremented as carries are generated.

As used herein "XEX" refers to an Xor-Encrypt-Xor encryption technique using a block cipher mode of operation. As used herein "XTS" refers to an XEX-based tweaked-codebook mode with ciphertext stealing using a cipher mode encryption technique.

As used herein "TMEi" refers to an encryption technique that uses XTS-based encryption and a MAC algorithm compatible with XTS. The MACs are stored in memory. Total Memory Encryption with integrity (TMEi) is another security feature which targets protecting the confidentiality and integrity of the entire platform memory. TMEi also finds usages in protection against software data corruption. In order for TMEi to provide integrity protections, it requires security metadata to be stored in memory. TMEi requires 6.25% of the entire memory reserved for storing security metadata when a 32 bit MAC is used. The storage overheads will vary based on the MAC size used and so will the security strength. In this example, a 56 b MAC is used as an example match size to match the MEE MAC size and strength. In this case, the memory overheads for MAC for TMEi will be 12.5% instead.

In the future flexible EPC and TMEi protections will be co-existent and it is desired that the system overheads associated with these technologies be minimized.

As used herein "flexible EPC" refers to instructions used to control the conversion of pages between regular and secure and allows the entire memory, if needed, to be used as SGX memory.

As used herein "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The following description utilizes two example types of encryption (TMEi and MEE) for explanation purposes only. It should be understood that other types of encryption may be used and that the disclosure is not necessarily limited to only the types of encryption used as examples.

FIG. 1 shows security metadata overhead in memory. In FIG. 1 a memory 100 is shown. Security metadata in this instance includes first and second encryption type MACs 102 and second encryption type counters 104. For example, the first encryption type may be TMEi and the first encryption type MACS are TMEi MACs. Also by way of example, the second encryption type is MEE and the security metadata includes MEE MACs and MEE counters.

Figure 2:
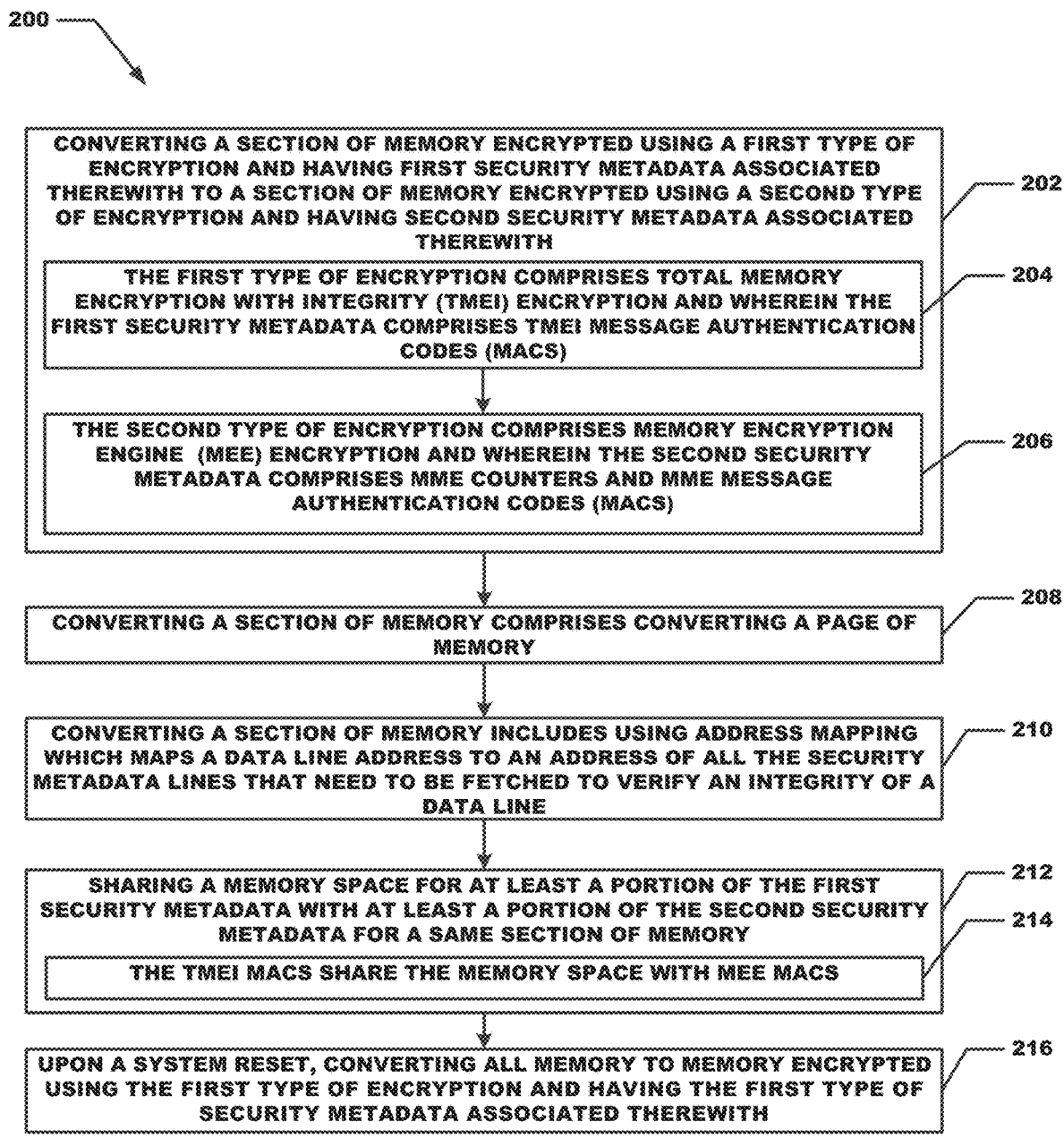
FIG. 2 is a flow diagram of a method for sharing security metadata memory space.

Flow diagrams of the presently disclosed methods are depicted in FIG. 1 and FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a flow diagram for a method of sharing security metadata memory space 200 is shown. Method 200 begins with processing block 202 which discloses converting a section of memory encrypted using a first type of encryption and having first security metadata associated therewith to a section of memory encrypted using a second type of encryption and having second security metadata associated therewith. As shown in processing block 204, in a particular embodiment, the first type of encryption comprises Total Memory Encryption with integrity (TMEi) encryption and wherein the first security metadata comprises TMEi Message Authentication Codes (MACs). As shown in processing block 206, in a particular example the second type of encryption comprises Memory Encryption Engine (MEE) encryption and wherein the second security metadata comprises MEE counters and MEE Message Authentication Codes (MACs).

Processing block 208 states wherein the converting a section of memory comprises converting a page of memory. In some embodiments it is more efficient to deal with pages of memory. A page of memory is a fixed-length contiguous block of memory.

Processing block 210 recites converting a section of memory includes using address mapping which maps a data line address to an address of all the security metadata lines that need to be fetched to verify an integrity of a data line.

Processing block 212 discloses sharing a memory space for at least a portion of the first security metadata with at least a portion of the second security metadata for a same section of memory. As further shown in processing block 214, in a particular example, the sharing at least a portion of the first security metadata with at least a portion of the second security metadata for a same section of memory comprises TMEi MACs sharing the memory space with MEE Macs.

Processing block 216 states wherein upon a system reset, converting all memory to memory encrypted using said first type of encryption and having said first type of security metadata associated therewith.

Figure 3:
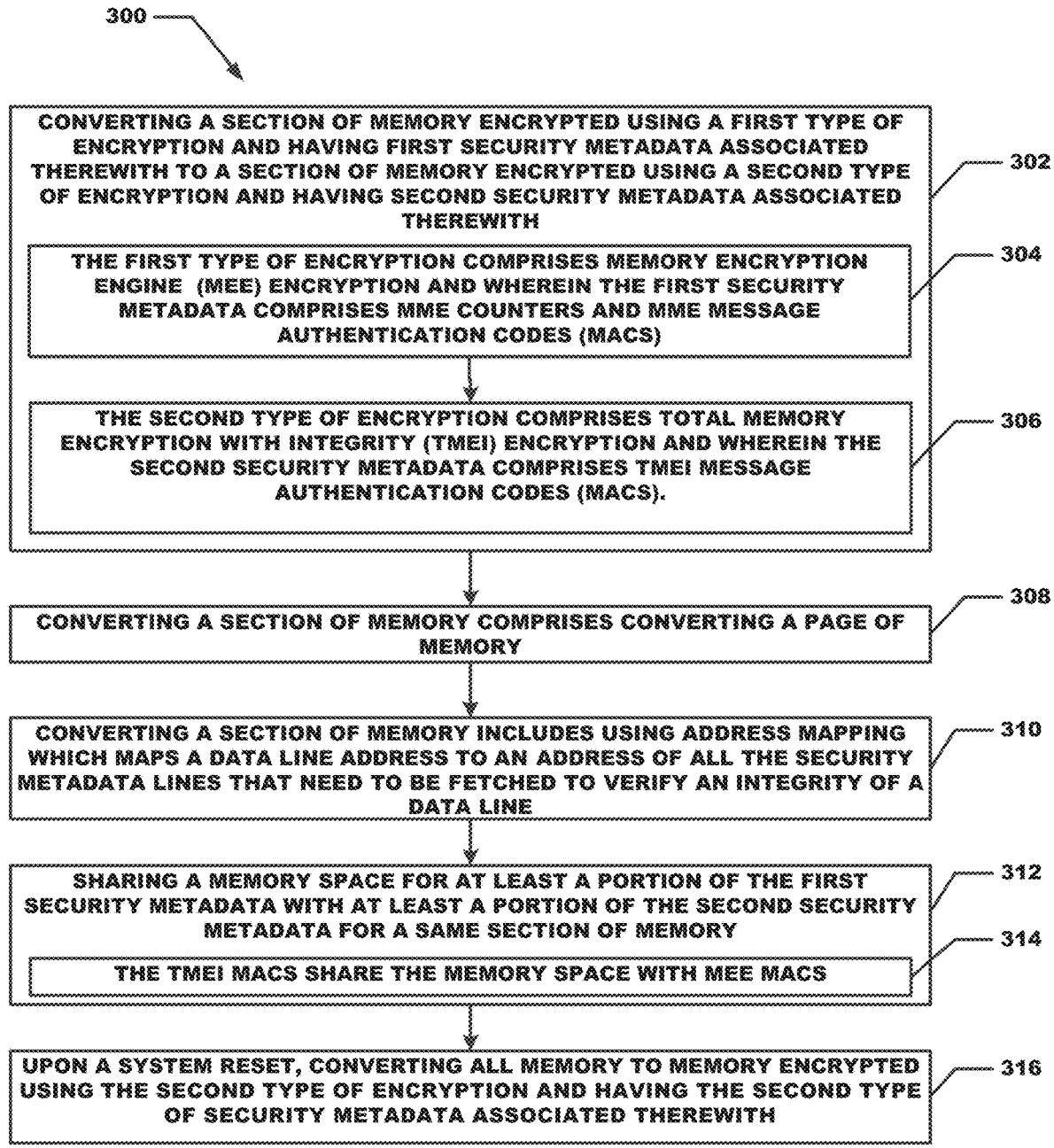
FIG. 3 is a flow diagram of another method for sharing security metadata memory space.

FIG. 3 discloses another method for sharing security metadata memory space 300. Method 300 begins with processing block 302 which discloses converting a section of memory encrypted using a first type of encryption and having first security metadata associated therewith to a section of memory encrypted using a second type of encryption and having second security metadata associated therewith. As shown in processing block 304, in a particular embodiment, the first type of encryption comprises Memory Encryption Engine (MEE) encryption and wherein the first security metadata comprises MEE counters and MEE Message Authentication Codes (MACs). As shown in processing block 306, in a particular embodiment, the second type of encryption comprises Total Memory Encryption with integrity (TMEi) encryption and wherein the first security metadata comprises TMEi Message Authentication Codes (MACs).

Processing block 308 states wherein the converting a section of memory comprises converting a page of memory. Processing block 310 recites converting a section of memory includes using address mapping which maps a data line address to an address of all the security metadata lines that need to be fetched to verify an integrity of a data line.

Processing block 312 discloses sharing a memory space for at least a portion of the first security metadata with at least a portion of the second security metadata for a same section of memory. As further shown in processing block 314, in a particular example, the sharing at least a portion of the first security metadata with at least a portion of the second security metadata for a same section of memory comprises TMEi MACs sharing the memory space with MEE Macs.

Processing block 316 states wherein upon a system reset, converting all memory to memory encrypted using the second type of encryption and having the second type of security metadata associated therewith.

The security protections provided by MEE or TMEi work by loading the data line along with the security metadata associated with the data line and verifying the security metadata loaded from memory to verify the integrity of the line when it was resident in memory. The system starts up with all memory as regular memory, naturally protected by TMEi. During the lifetime of the system, pages are converted to EPC for enclave use using an instruction provided with flexible EPC, EMKEPC. Similarly, pages are converted back to regular using the flexible EPC instruction, EMKNONEPC. On execution of EMKEPC, the EPC page comes under the protection of the MEE and on execution of EMKNONEPC, the page is moved out of the MEE protections and is instead protected by TMEi engine.

At any point in time, a memory page gets the protections of either the MEE or the TMEi engine but never both. The present disclosure relates to a method and/or apparatus for sharing of a metadata region for MEE and TMEi. More specifically, the MAC region is shared between MEE and TMEi. With flexible EPC, on converting a page to regular memory (MEE to TMEi), the counters associated with the page are reset to prevent integrity failures on the page, the next time it is converted back to EPC (TMEi to MEE) and read by and enclave (MEE uses a reset counter as an indication to skip integrity verification). In order to allow the metadata sharing, the flexible EPC instruction for converting to a non-EPC page, in addition to resetting the counters associated with the data lines on a page, also initializes the MAC lines associated with the page. This prevents any false integrity failures once a page is converted to non-EPC and comes under the protection of TMEi. The proposed invention enables TMEi protections at zero storage overhead, making TMEi much more attractive to OSVs.

MEE builds a tree of counters and MAC values over the protected memory. This tree provides integrity and replay protection to SGX data when resident in memory. The verification proceeds by walking up the tree branch for a loaded data line until a root (stored on die) is reached (or there is a hit for a metadata cache line in the internal metadata cache). The MEE tree is self-initializing. At system boot-up, the top-level counters in the tree are initialized to zero before any accesses to MEE can go through. Any data line in the protected region, when first accessed, will climb up the tree and on finding any counter line in initialized state, the authentication is skipped and instead the intermediate metadata lines before the top-level counter in the tree are filled to the MEE cache in a special init mode. From here on in, a write to the data line increments the counters along the tree branch up to the root and a read verifies the counters using MACs embedded in the counter cache lines. At the lowest level in the tree, each data line is associated with a MAC and a counter value also known as the version of the cache line. There is a fixed mapping from the data line to the tree nodes implemented inside the MEE to load and verify the nodes when needed. A MAC is 56 b in length allowing for 8 data line MACs to be stored in one MAC line.

Figure 4:
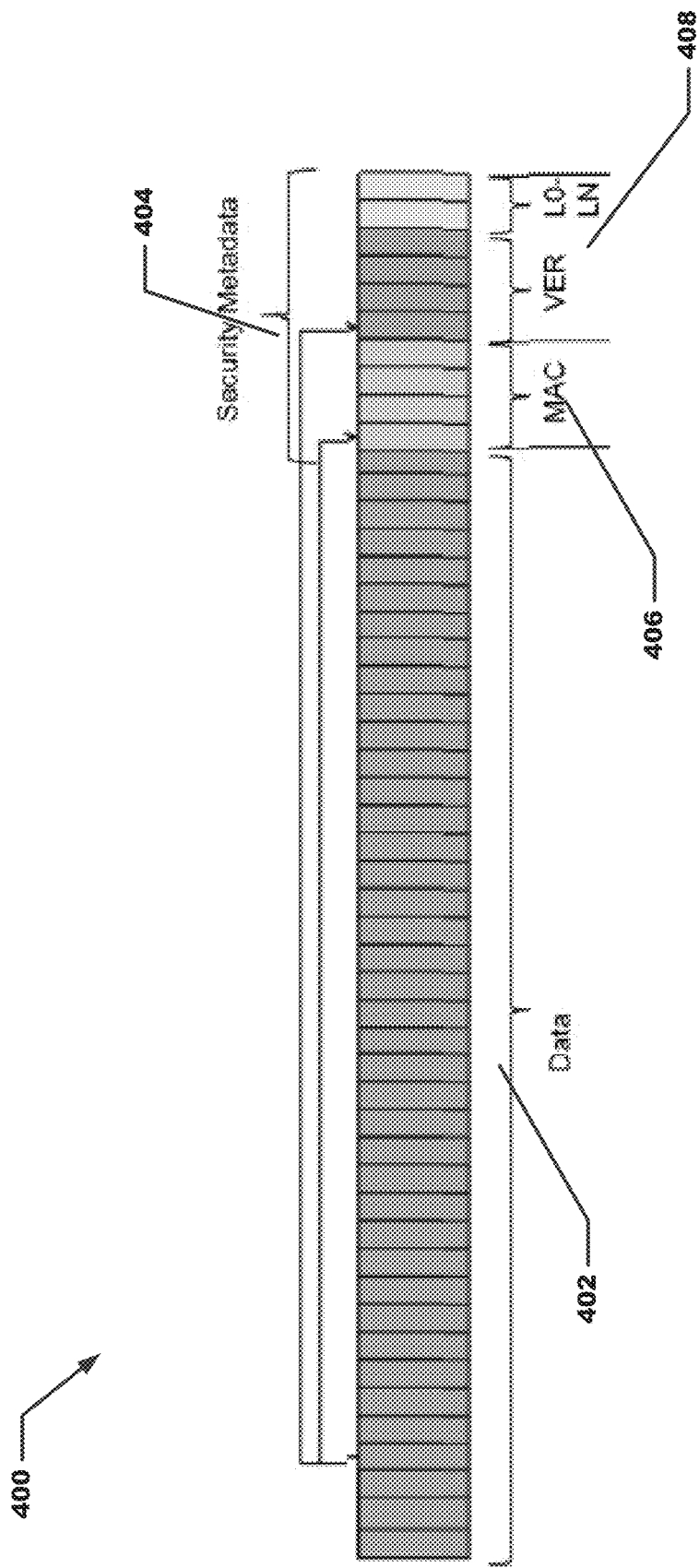
FIG. 4 is a diagram of a memory layout consistent with several embodiments of the present disclosure.

FIG. 4 shows MEE metadata mapping 400. The MEE mapping shows the data lines and their relationship with security metadata lines in memory. The metadata mapping shows data 402, and the security metadata 404. The security metadata includes the MEE MAC 406 and the MEE counters 106. The mapping to higher levels in the trees (L0-LN) is not shown in the figure for simplicity.

TMEi uses a data-dependent mode of encryption (e.g., XTS) and likewise, does not have any counters associated with a cache line. Each cache line protected by TMEi has a MAC associated with it. In order to maintain the same security strength MAC as the MEE, the MAC length is kept at 56 b for this first embodiment of the invention.

Similar to MEE, TMEi needs initialization of the MAC values as well to ensure that a read to a data line never written before does not result in an integrity failure. On system reset, the MAC region can be initialized in several ways. As an example, the BIOS can zero out the MAC lines with a zero MAC value treated as the initial value for MACs. On fetching a MAC line with zero value, the MAC verification is skipped.

At any point in time, a memory page is either protected using the MEE (i.e., an EPC page) or using TMEi and hence the security metadata, more specifically the MACs, are not required to be stored separately. However, since on converting a page from EPC to non-EPC, the page contents and corresponding MACs are not valid anymore and the fact that TMEi and MEE use different cryptographic algorithms, the page conversion also accounts for not only re-setting the counters which is used by the MEE as an indication for uninitialized memory but also for resetting the MACs to ensure that TMEi engine treats the line as uninitialized. On conversion from EPC to non-EPC, the TMEi MACs are initialized to zero. From a security viewpoint, this can enable untrusted software to control page conversions and then inject arbitrary data to the application. This is possible as the reset of MACs will cause the TMEi engine to skip the MAC verification. In order to defend against such attacks, the TMEi engine on fetching a MAC in initalized state will return all zeros irrespective of what is returned by memory. This ensures that an attacker cannot inject desired data to an application by controlling page conversions.

FIG. 4 shows the memory layout of the memory on a reset. The entire data region is protected by TMEi and there is no SGX memory present on the platform. The memory layout 400 shows data 402 and the associated security metadata 404. The security metadata region 404 includes two regions: MAC region 406 that is shared by MEE and TMEi and counters 408 (version and L0-LN) which are exclusively used by the MEE. In the memory layout 400, since the data lines are all TMEi protected, the MAC lines correspond to TMEi MAC metadata and the counters are unused.

Figure 5:
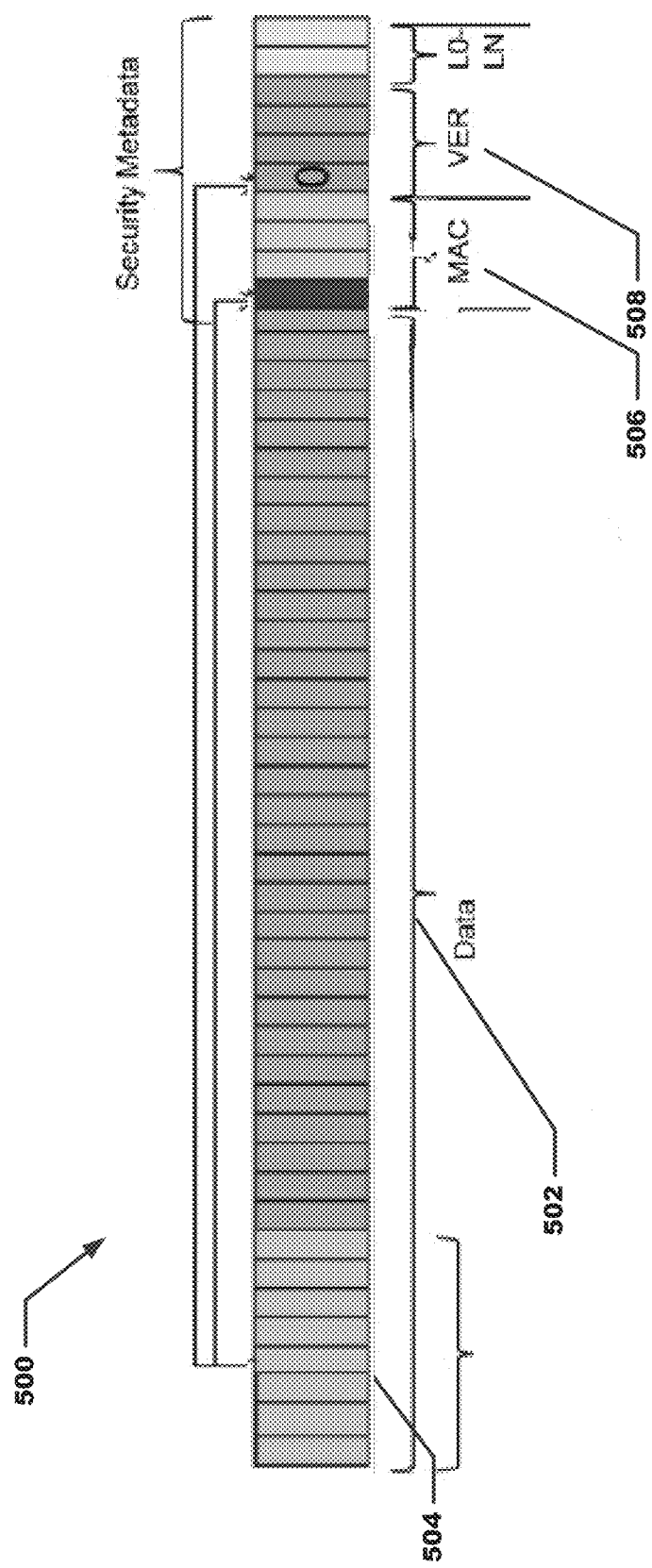
FIG. 5 is a diagram of a memory layout affected by page conversion to EPC consistent with several embodiments of the present disclosure.

FIG. 5 shows the updated memory layout after converting a page protected by TMEi to a page protected with MEE for SGX/enclave use. After the conversion, the data lines 502 belonging to the page including lines 504 come under the protection of the MEE and the corresponding metadata lines are updated. The MAC lines for the page 506 will now be used by the MEE and the version line 508 for the page will now be used as well to store version counters for the data lines on the page. It should be noted that in FIG. 5, the zeroing of the version line is only for clarity as this step is carried out at the time of converting a page to regular. For a system after reset, the top-level counters stored on die will indicate uninitialized memory. The scenario shown in FIG. 5 is reflective of a system where a page has been used for enclave use, converted to regular, and re-converted to EPC for enclave use. In this case, the on-die counters have valid values updated by previous enclave writes to the page and not zeroing out the version counters will result in integrity failures.

Figure 6:
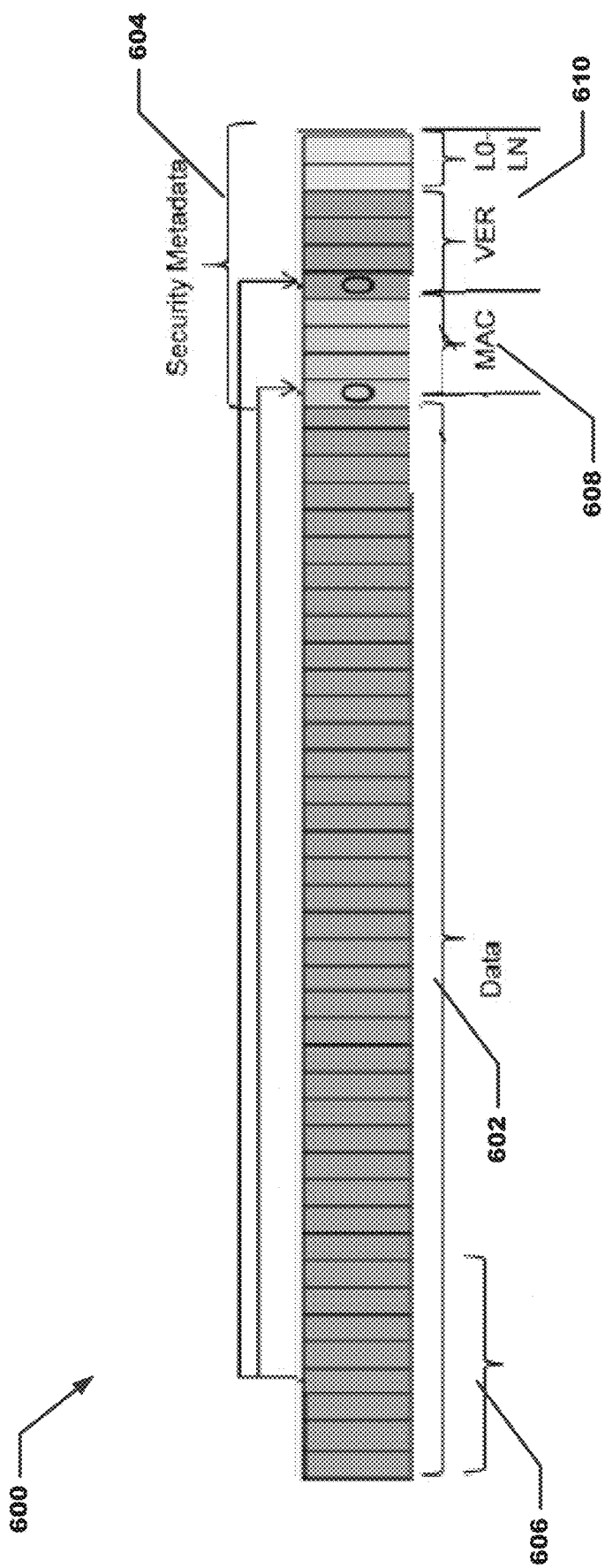
FIG. 6 is a diagram of a memory layout affected by page conversion to non-EPC according to various embodiments of the present disclosure.

FIG. 6 shows the updated layout and actions on conversion of the page to regular by the OS. For the page conversion to non-EPC using Flexible EPC ISA, the page converted in FIG. 5 is converted back to regular using flexible EPC ISA, EMKNONEPC. In this case, as described above, the data is shown as 602 and includes region 606. In addition to zeroing the version counters 610 associated with the page (required when the page is converted to EPC page at a later point in time), the MAC values 608 are zeroed out as well to indicate to the TMEi engine that these data lines are uninitialized and it can skip integrity checking on these lines, avoiding false integrity failures.

Figure 7:
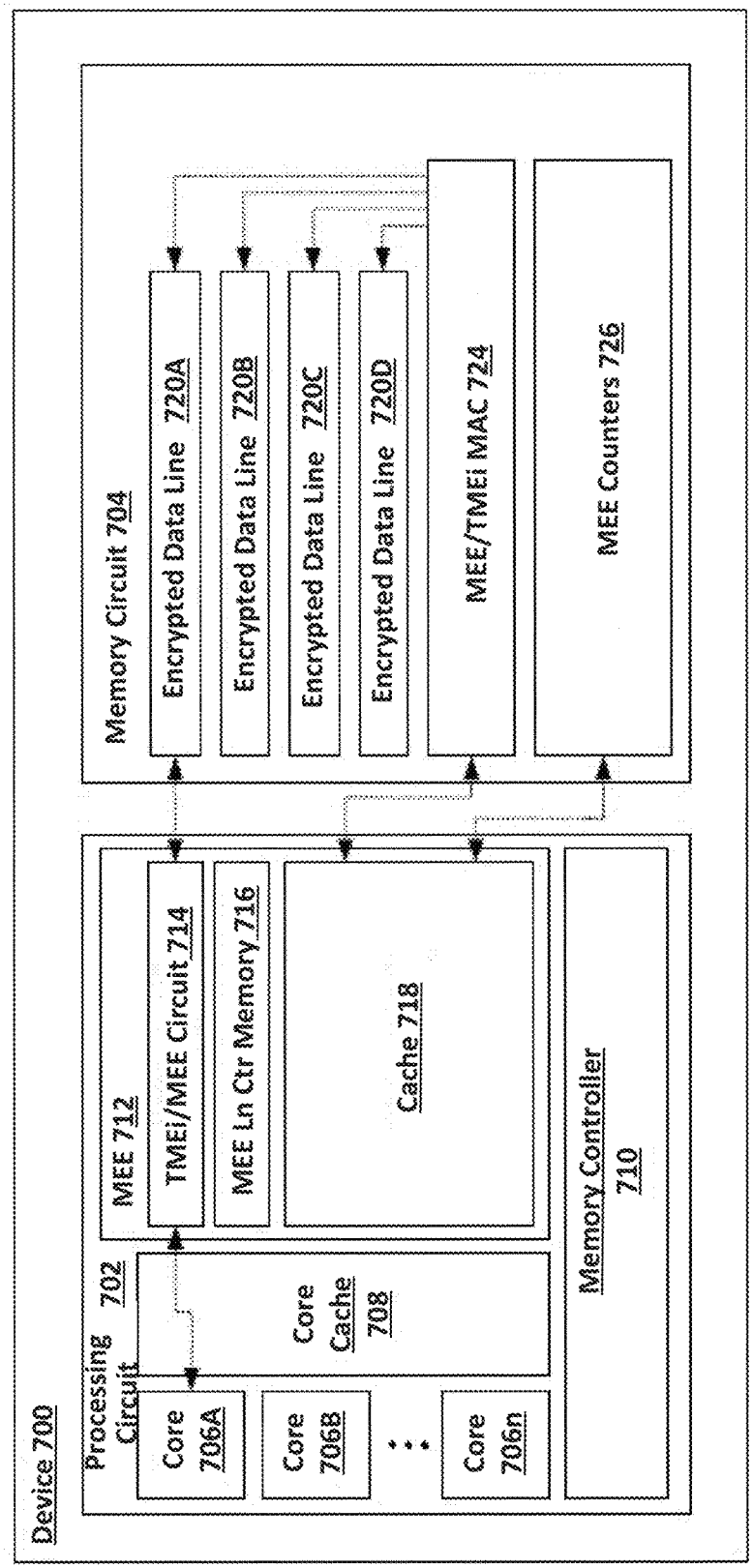
FIG. 7 is a block diagram of a processing module according to various embodiments of the present disclosure.

As illustrated in FIG. 7, processing circuit 702 may comprise, for example, at least one processing core 706 (e.g., core 706A, core 706B . . . core 706n, collectively, "cores 706A . . . n"), core cache 708, memory controller 710 and MEE 712. Cores 706 . . . n may perform various data processing operations that may utilize data stored in core cache 708. As referenced herein, a "cache" may comprise local volatile memory to hold data that may be utilized during a data processing operation. In at least one embodiment, core cache 708 may comprise a plurality of separate memory areas organized in levels with the outmost level (e.g., from which data may be transmitted to, and received from, TMEi/MEE circuit 714) being the last level cache (LLC). Core cache 708 helps to expedite data processing by avoiding having to repeatedly retrieve data that may be used more than once during a data processing operation from memory circuit 704. Memory controller 710 may control how processing circuit 702 may access memory circuit 704, including reading data from memory circuit 704 and writing data to memory circuit 704.

MEE 712 may comprise, for example, TMEi/MEE circuit 714 to perform memory protection operations, MEE Ln counter memory 716 to hold top-level counter data, and MEE cache 718 to hold security metadata at least during memory protection operations. In general, security metadata may comprise data utilized in support of memory protection operations. For example, consistent with the present disclosure core 706A may perform data processing operations requiring data secured by a protection system such as SGX. Protected data such as encrypted data line 720A, encrypted data line 720B, encrypted data line 720C and encrypted data line 720D (collectively, "encrypted data lines 720A . . . D") in memory module 704 may be retrieved by TMEi/MEE logic 714 and decrypted prior to being provided to core 706A. While only four encrypted data lines 520A . . . D corresponding to VER and MAC data in a single data line 728 are shown, the actual number of encrypted data lines 720A . . . D in memory module 704 may depend on a variety of factors such as, for example, the size of the MEE-protected region in memory module 704. In at least one example implementation, each data line may comprise 64B (Bytes) of data that may be stored in a protected region of memory module 704 comprising 128 MB (Megabytes). Likewise, data generated by core 706A that may be sensitive, confidential, etc. may be provided to TMEi/MEE logic 714 for encryption prior to storage in memory module 704. In this manner, an attacker monitoring data being exchanged between processing module 702 and memory module 704 may be prevented from determining the content of certain data that may be sensitive, confidential, etc.

Figure 8:
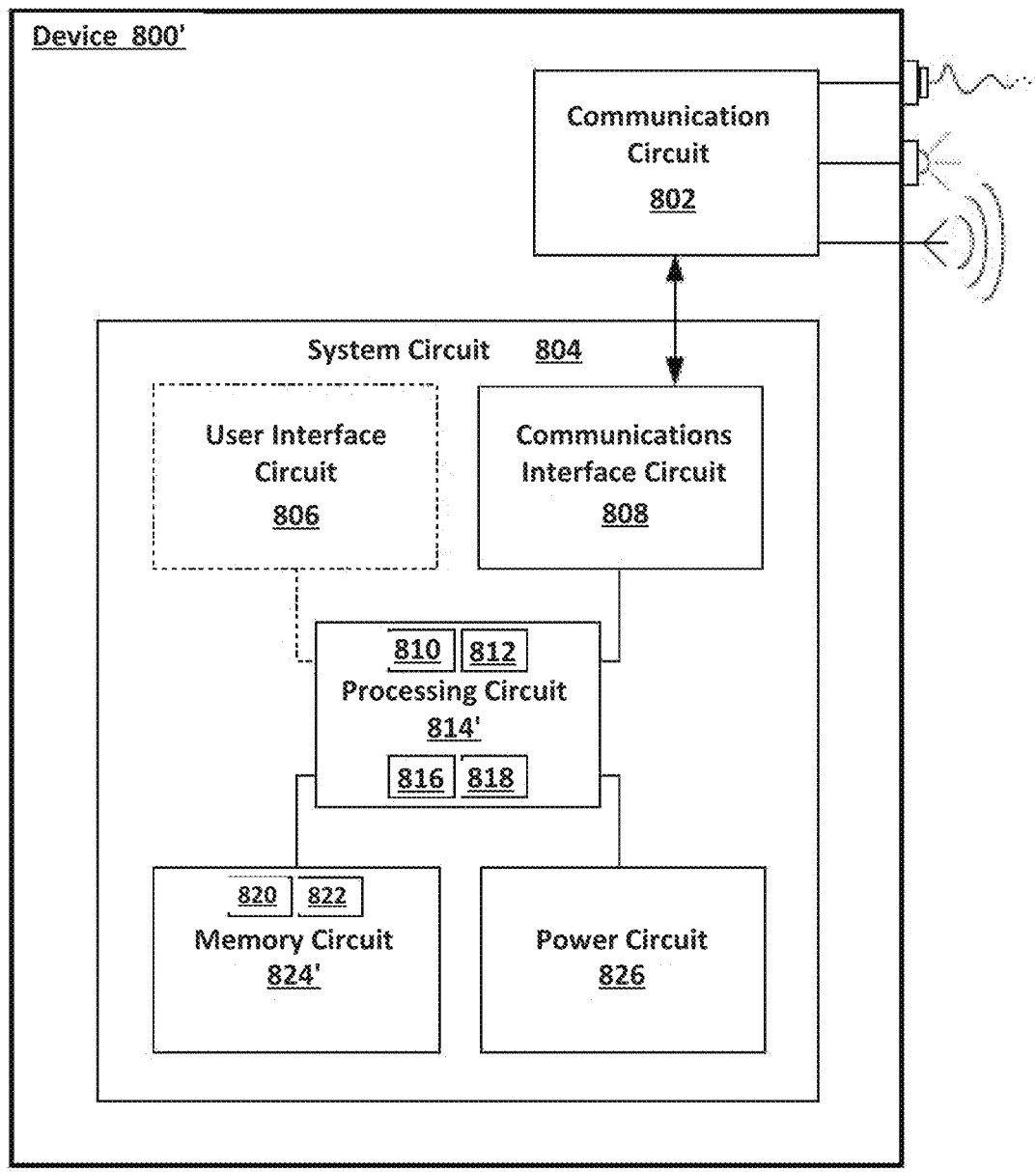
FIG. 8 illustrates an example configuration for a device according to various embodiments of the present disclosure.

FIG. 8 illustrates an example configuration for a device 800' usable in accordance with at least one embodiment of the present disclosure. The inclusion of an apostrophe after an item number (e.g., 800') in the present disclosure may indicate that an example embodiment of the particular item is being illustrated. For example, device 800' may be capable of performing any or all of the activities disclosed in FIG. 7. However, device 800' is presented herein only as an example of an apparatus usable in embodiments consistent with the present disclosure, and is not intended to limit any of the various embodiments to any particular manner of implementation.

Device 800' may comprise, for example, system circuit 804 to manage operation of the device. System module 800' may include, for example, processing circuit 814', memory circuit 824', power circuit 826, user interface circuit 806 and communication interface circuit 808. Device 800' may further include communication circuit 802. While communication circuit 802 is illustrated as separate from system circuit 804, the example configuration shown in FIG. 8 has been provided merely for the sake of explanation. Some or all of the functionality associated with communication circuit 802 may also be incorporated into system circuit 804.

In device 800', processing circuit 814' may comprise one or more processors situated in separate components, or alternatively one or more cores 806A . . . n in a single component (e.g., in a System-on-a-Chip (SoC) configuration), along with processor-related support circuitry (e.g., bridging interfaces, etc.). As shown in FIG. 7, processing circuit 814' may comprise at least cores 706A . . . n, core cache 708, memory controller 710, and MEE 712.

Processing circuit 814' may be configured to execute various instructions in device 800'. Instructions may include program code configured to cause processing circuit 814' to perform activities related to reading data, writing data, processing data, formulating data, converting data, transforming data, etc. Information (e.g., instructions, data, etc.) may be stored in memory circuit 824'. Memory circuit 824' may comprise random access memory (RAM) and/or read-only memory (ROM) in a fixed or removable format. RAM may include volatile memory configured to hold information during the operation of device 800' such as, for example, static RAM (SRAM) or Dynamic RAM (DRAM). ROM may include non-volatile (NV) memory modules configured based on BIOS, UEFI, etc. to provide instructions when device 800' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc. As shown in FIG. 7, memory circuit 704 may comprise at least encrypted data lines 720A . . . D and security metadata (e.g., MEE/TMEi MAC data 724 and MEE counters 726).

Power circuit 826 may include internal power sources (e.g., a battery, fuel cell, etc.) and/or external power sources (e.g., electromechanical or solar generator, power grid, external fuel cell, etc.), and related circuitry configured to supply device 500' with the power needed to operate. User interface circuit 806 may include hardware and/or software to allow users to interact with device 800' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuit 806 may be incorporated within device 800' and/or may be coupled to device 800' via a wired or wireless communication medium. User interface circuit 806 may be optional in certain circumstances such as, for example, a situation wherein device 800' is a server (e.g., rack server, blade server, etc.) that does not include user interface circuit 806, and instead relies on another device (e.g., a management terminal) for user interface functionality.

Communication interface circuit 808 may be configured to manage packet routing and other control functions for communication circuit 802, which may include resources configured to support wired and/or wireless communications. In some instances, device 800' may comprise more than one communication circuit 802 (e.g., including separate physical interface circuits for wired protocols and/or wireless radios) managed by a centralized communication interface circuit 806. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface circuit 808 may be configured to prevent wireless communications that are active in communication circuit 608 from interfering with each other. In performing this function, communication interface circuit 808 may schedule activities for communication circuit 802 based on, for example, the relative priority of messages awaiting transmission. While the embodiment disclosed in FIG. 8 illustrates communication interface circuit 808 being separate from communication circuit 802, it may also be possible for the functionality of communication interface circuit 808 and communication circuit 802 to be incorporated into the same circuit.

The above description has shown how the present disclosure can be used to share the MAC metadata region between MEE and TMEi without causing integrity failures. The present disclosure results in zero storage overheads for TMEi by simply piggybacking on the storage reserved for MEE metadata.

There are additional optimizations to reduce the storage overheads of MEE metadata. One optimization relates to MAC/Counter size reduction. With this optimization, the size of MAC and counters is reduced to decrease the overall storage needed for metadata while maintaining the security properties. With this optimization, the present disclosure works unmodified using the same sized MACs as used by the MEE to achieve the same cryptographic strength as SGX.

Another optimization relates to cryptograhic cache lines. With this optimization, multiple data lines are associated with a single MAC and counter value, effectively reducing the overall metadata overhead depending on the number of lines over which metadata is shared. With this optimization implemented, the present disclosure can work in one of two ways.

A first way is to use the same metadata granularity for TMEi. This translates to essentially associating one MAC with multiple lines even when data is TMEi protected. This option can have performance implications in that now for each data line requested by the processor, multiple lines might need to be loaded to verify the MAC associated with the requested line.

A second way is to use the MAC area allocated for MEE and allocate a smaller metadata area separate from MEE. In this option, the TMEi engine uses the MAC space allocated for the MEE but also needs additional dedicated space for the MACs for the remaining lines. As an example, with a granularity of 2 for this optimization, 2 system cache lines will be associated with one MAC value and likewise, the MAC storage will be half of what is needed if there were a MAC value associated with each data line. In this case, half of the memory protected by TMEi will use the MEE allocated region for MACs and the remaining half will use a dedicated storage for TMEi. This dedicated storage can be allocated by the BIOS and programmed in to the TMEi engine by the BIOS. This option avoids the need for multiple line loads for non-SGX data lines but comes at the additional system storage cost for TMEi. However, even in this case, it can reduce the storage overheads required by TMEi to 50% of what were needed without the invention.

The presently disclosed method allows metadata sharing between first and second encryption types. The technique is based on the fact that at any point in time, a memory page can either be protected by a first encryption type or with a second encryption type. Consequently the metadata required for a page is either for MEE or for TMEi, but never both.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a reconfigurable repeater system, as provided below.

According to example 1 there is provided a computer system. The computer system may include a processor, a memory in communication with the processor, and an application stored in memory. The application causes the processor to perform the operation of converting a section of memory encrypted using a first type of encryption and having first security metadata associated therewith to said section of memory encrypted using a second type of encryption having second security metadata associated therewith;

and wherein at least a portion of said first security metadata shares a memory space with at least a portion of said second security metadata for a same section of memory.

Example 2 may include the elements of example 1, wherein said section of memory encrypted using a first type of encryption comprises a section of memory encrypted using Total Memory Encryption with integrity (TMEi) encryption.

Example 3 may include the elements of example land example 2, wherein the first security metadata comprises TMEi Message Authentication Codes (MACs).

Example 4 may include the elements of example 1, wherein converting a section of memory using a second type of encryption comprises encrypting a section of memory using Memory Encryption Engine (MEE) encryption.

Example 5 may include the elements of example land example 4, wherein converting a section of memory using a second type of encryption comprises encrypting a section of memory wherein the second security metadata comprises MEE counters and MEE Message Authentication Codes (MACs).

Example 6 may include the elements of example 1, wherein said section of memory encrypted using a first type of encryption comprises a section of memory encrypted using encrypted using Memory Encryption Engine (MEE) encryption.

Example 7 may include the elements of example land example 6, wherein the first security metadata comprises MEE counters and MEE Message Authentication Codes (MACs).

Example 8 may include the elements of example 1, wherein converting a section of memory using a second type of encryption comprises encrypting a section of memory using Total Memory Encryption with integrity (TMEi) encryption.

Example 9 may include the elements of example land example 8, wherein converting a section of memory using a second type of encryption comprises encrypting a section of memory wherein the second security metadata comprises TMEi Message Authentication Codes (MACs).

Example 10 may include the elements of example 1, wherein converting a section of memory comprises converting a page of memory.

Example 11 may include the elements of example 1 wherein converting a section of memory includes using address mapping.

Example 12 may include the elements of example 1 and example 11 wherein address mapping maps a data line address to an address of all the security metadata lines that need to be fetched to verify an integrity of a data line.

Example 13 may include the elements of example 1, wherein upon a system reset, all memory is converted to memory encrypted using the first type of encryption.

Example 14 may include the elements of example 1 and example 13, wherein upon a system reset, all memory is converted to memory encrypted using the first type of encryption and having the first type of security metadata associated therewith.

Example 15 may include the elements of example 1 and example 3, wherein the at least a portion of said first security metadata shares a memory space with at least a portion of second security metadata for a same section of memory comprises TMEi MACs sharing the memory space with MEE Macs.

Example 16 may include the elements of example 1 and example 5, wherein the at least a portion of the first security metadata shares a memory space with at least a portion of the second security metadata for a same section of memory comprises TMEi MACs sharing said memory space with MEE Macs.

According to example 17 there is provided a method for sharing security metadata memory space. The method may comprise executing an instruction for converting a section of memory encrypted using a first type of encryption and having first security metadata associated therewith to said section of memory encrypted using a second type of encryption having second security metadata associated therewith; and wherein at least a portion of said first security metadata shares a memory space with at least a portion of said second security metadata for a same section of memory.

Example 18 may include the elements of example 17, wherein said section of memory encrypted using a first type of encryption comprises a section of memory encrypted using Total Memory Encryption with integrity (TMEi) encryption.

Example 19 may include the elements of example 17 and example 18, wherein the first security metadata comprises TMEi Message Authentication Codes (MACs).

Example 20 may include the elements of example 17, wherein converting a section of memory using a second type of encryption comprises encrypting a section of memory using Memory Encryption Engine (MEE) encryption.

Example 21 may include the elements of example 17 and example 20, wherein converting a section of memory using a second type of encryption comprises encrypting a section of memory wherein the second security metadata comprises MEE counters and MEE Message Authentication Codes (MACs).

Example 22 may include the elements of example 17, wherein said section of memory encrypted using a first type of encryption comprises a section of memory encrypted using encrypted using Memory Encryption Engine (MEE) encryption.

Example 23 may include the elements of example 17 and example 22, wherein the first security metadata comprises MEE counters and MEE Message Authentication Codes (MACs).

Example 24 may include the elements of example 17, wherein converting a section of memory using a second type of encryption comprises encrypting a section of memory using Total Memory Encryption with integrity (TMEi) encryption.

Example 25 may include the elements of example 17 and example 24, wherein converting a section of memory using a second type of encryption comprises encrypting a section of memory wherein the second security metadata comprises TMEi Message Authentication Codes (MACs).

Example 26 may include the elements of example 17, wherein converting a section of memory comprises converting a page of memory.

Example 27 may include the elements of example 17 wherein converting a section of memory includes using address mapping.

Example 28 may include the elements of example 17 and example 27, wherein address mapping maps a data line address to an address of all the security metadata lines that need to be fetched to verify an integrity of a data line.

Example 29 may include the elements of example 17, wherein upon a system reset, all memory is converted to memory encrypted using the first type of encryption.

Example 30 may include the elements of example 17 and example 29, wherein upon a system reset, all memory is converted to memory encrypted using the first type of encryption and having the first type of security metadata associated therewith.

Example 31 may include the elements of example 17 and example 19, wherein the at least a portion of said first security metadata shares a memory space with at least a portion of second security metadata for a same section of memory comprises TMEi MACs sharing the memory space with MEE Macs.

Example 32 may include the elements of example 17 and example 31, wherein the at least a portion of the first security metadata shares a memory space with at least a portion of the second security metadata for a same section of memory comprises TMEi MACs sharing said memory space with MEE Macs.

According to example 33, there is provided a computer readable storage device having stored thereon instructions that when executed by one or more processors result in the following operations: converting a section of memory encrypted using a first type of encryption and having first security metadata associated therewith to said section of memory encrypted using a second type of encryption having second security metadata associated therewith; and sharing a memory space for at least a portion of said first security metadata shares with at least a portion of said second security metadata for a same section of memory.

Example 34 may include the elements of example 33, wherein said section of memory encrypted using a first type of encryption comprises a section of memory encrypted using Total Memory Encryption with integrity (TMEi) encryption.

Example 35 may include the elements of example 33 and example 34, wherein the first security metadata comprises TMEi Message Authentication Codes (MACs).

Example 36 may include the elements of example 33, wherein converting a section of memory using a second type of encryption comprises encrypting a section of memory using Memory Encryption Engine (MEE) encryption.

Example 37 may include the elements of example 33 and example 36, wherein converting a section of memory using a second type of encryption comprises encrypting a section of memory wherein the second security metadata comprises MEE counters and MEE Message Authentication Codes (MACs).

Example 38 may include the elements of example 33, wherein said section of memory encrypted using a first type of encryption comprises a section of memory encrypted using encrypted using Memory Encryption Engine (MEE) encryption.

Example 39 may include the elements of example 33 and example 38, wherein the first security metadata comprises MEE counters and MEE Message Authentication Codes (MACs).

Example 40 may include the elements of example 33, wherein converting a section of memory using a second type of encryption comprises encrypting a section of memory using Total Memory Encryption with integrity (TMEi) encryption.

Example 41 may include the elements of example 33 and example 40, wherein converting a section of memory using a second type of encryption comprises encrypting a section of memory wherein the second security metadata comprises TMEi Message Authentication Codes (MACs).

Example 42 may include the elements of example 33, wherein converting a section of memory comprises converting a page of memory.

Example 43 may include the elements of example 33 wherein converting a section of memory includes using address mapping.

Example 44 may include the elements of example 33 and example 43 wherein address mapping maps a data line address to an address of all the security metadata lines that need to be fetched to verify an integrity of a data line.

Example 45 may include the elements of example 33, wherein upon a system reset, all memory is converted to memory encrypted using the first type of encryption.

Example 46 may include the elements of example 33 and example 45, wherein upon a system reset, all memory is converted to memory encrypted using the first type of encryption and having the first type of security metadata associated therewith.

Example 47 may include the elements of example 33 and example 35, wherein the at least a portion of said first security metadata shares a memory space with at least a portion of second security metadata for a same section of memory comprises TMEi MACs sharing the memory space with MEE Macs.

Example 48 may include the elements of example 33 and example 37, wherein the at least a portion of the first security metadata shares a memory space with at least a portion of the second security metadata for a same section of memory comprises TMEi MACs sharing said memory space with MEE Macs.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system, comprising:
   system memory circuitry;
   enclave memory circuitry; and
   memory controller circuitry communicatively coupled to the system memory circuitry and to the enclave memory circuitry, the memory controller circuitry to:
   encrypt a first memory page of a plurality of memory pages stored in the system memory circuitry using a first encryption method, the first encryption method having a first metadata associated therewith, the first metadata including a first message authentication code calculated using a first technique;
   store the first metadata in a memory location associated with the first memory page;
   transfer the first memory page of the plurality of memory pages from the system memory circuitry to the enclave memory circuitry responsive to receipt of a request from an operating system executed by processor circuitry communicatively coupled to the memory controller circuitry;
   encrypt the first memory page transferred from the system memory circuitry to the enclave memory circuitry using a second encryption method different from the first encryption method, the second encryption method having a second metadata associated therewith, the second metadata including a second message authentication code calculated using a second technique; and
   replace at least a portion of the first metadata, stored in the memory location and including the first message authentication code calculated using the first technique, with at least a portion of the second metadata including the second message authentication code calculated using the second technique.

2. The system of claim 1, the memory controller circuitry to further:
transfer the first memory page from the enclave memory circuitry to the system memory circuitry responsive to receipt of a request from the operating system executed by the processor circuitry;
encrypt the first memory page transferred from the enclave memory circuitry to the system memory circuitry using the first encryption method; and
replace at least a portion of the second metadata, stored in the memory location and including the second message authentication code calculated using the second technique, with at least a portion of the first metadata.

3. The system of claim 1, wherein the first encryption method includes a Total Memory Encryption and integrity (TMEi) encryption method.

4. The system of claim 3, wherein the first metadata includes Total Memory Encryption and integrity Message Authentication Codes (TMEi-MACs).

5. The system of claim 1, wherein the second encryption method includes a Memory Encryption Engine (MEE) encryption method.

6. The system of claim 5, wherein the second metadata includes Memory Encryption Engine counter data.

7. The system of claim 6, wherein the second metadata further includes Memory Encryption Engine Message Authentication Codes.

8. An encryption method, comprising:
encrypting, by memory controller circuitry, a first memory page of a plurality of memory pages stored in system memory circuitry using a first encryption method, the first encryption method having a first metadata associated therewith, the first metadata including a first message authentication code calculated using a first technique;
storing, by the memory controller circuitry, the first metadata in a memory location associated with the first memory page;
transferring, by the memory controller circuitry, the first memory page of the plurality of memory pages from the system memory circuitry to enclave memory circuitry responsive to receipt of a request from an operating system executed by processor circuitry communicatively coupled to the memory controller circuitry;
encrypting, by the memory controller circuitry, the first memory page transferred from the system memory circuitry to the enclave memory circuitry using a second encryption method different from the first encryption method, the second encryption method having a second metadata associated therewith, the second metadata including a second message authentication code calculated using a second technique; and
replacing, by the memory controller circuitry, at least a portion of the first metadata, stored in the memory location and including the first message authentication code calculated using the first technique, with at least a portion of the second metadata including the second message authentication code calculated using the second technique.

9. The method of claim 8, further comprising:
transferring, by the memory controller circuitry, the first memory page from the enclave memory circuitry to the system memory circuitry responsive to receipt of a request from the operating system executed by the processor circuitry;
encrypting, by the memory controller circuitry, the first memory page transferred from the enclave memory circuitry to the system memory circuitry using the first encryption method; and
replacing, by the memory controller circuitry, at least a portion of the second metadata, stored in the memory location and including the second message authentication code calculated using the second technique, with at least a portion of the first metadata.

10. The method of claim 8, wherein the encrypting the first memory page of the plurality of memory pages stored in the system memory circuitry using the first encryption method further comprises:
encrypting, by the memory controller circuitry, the first memory page of the plurality of memory pages stored in the system memory circuitry using a Total Memory Encryption and integrity (TMEi) encryption method.

11. The method of claim 10, wherein the encrypting the first memory page of the plurality of memory pages stored in the system memory circuitry using the first encryption method further comprises:
encrypting, by the memory controller circuitry, the first memory page of the plurality of memory pages stored in the system memory circuitry using the Total Memory Encryption and integrity (TMEi) encryption method, wherein the first metadata includes Total Memory Encryption and integrity Message Authentication Codes (TMEi-MACs).

12. The method of claim 8, wherein the encrypting the first memory page transferred from the system memory circuitry to the enclave memory circuitry using the second encryption method further comprises:
encrypting, by the memory controller circuitry, the first memory page transferred from the system memory circuitry to the enclave memory circuitry using a Memory Encryption Engine (MEE) encryption method.

13. The method of claim 12, wherein the encrypting the first memory page transferred from the system memory circuitry to the enclave memory circuitry using the second encryption method further comprises:
encrypting, by the memory controller circuitry, the first memory page transferred from the system memory circuitry to the enclave memory circuitry using the Memory Encryption Engine (MEE) encryption method, wherein the second metadata includes Memory Encryption Engine counter data.

14. The method of claim 13, wherein the encrypting the first memory page transferred from the system memory circuitry to the enclave memory circuitry using the second encryption method further comprises:
encrypting, by the memory controller circuitry, the first memory page transferred from the system memory circuitry to the enclave memory circuitry using the Memory Encryption Engine (MEE) encryption method, wherein the second metadata further includes Memory Encryption Engine Message Authentication Codes.

15. A non-transitory storage device that includes instructions that, when executed by controller circuitry, causes the controller circuitry to:
encrypt a first memory page of a plurality of memory pages stored in system memory circuitry using a first encryption method, the first encryption method having a first metadata associated therewith, the first metadata including a first message authentication code calculated using a first technique;

store the first metadata in a memory location associated with the first memory page;

transfer the first memory page of the plurality of memory pages from the system memory circuitry to enclave memory circuitry responsive to receipt of a request from an operating system executed by processor circuitry communicatively coupled to the controller circuitry;

encrypt the first memory page transferred from the system memory circuitry to the enclave memory circuitry using a second encryption method different from the first encryption method, the second encryption method having a second metadata associated therewith, the second metadata including a second message authentication code calculated using a second technique; and replace at least a portion of the first metadata, stored in the memory location and including the first message authentication code calculated using the first technique, with at least a portion of the second metadata including the second message authentication code calculated using the second technique.

16. The non-transitory storage device of claim 15, wherein the instructions further cause the controller circuitry to:

transfer the first memory page from the enclave memory circuitry to the system memory circuitry responsive to receipt of a request from the operating system executed by the processor circuitry;

encrypt the first memory page transferred from the enclave memory circuitry to the system memory circuitry using the first encryption method; and replace at least a portion of the second metadata, stored in the memory location and including the second message authentication code calculated using the second technique, with at least a portion of the first metadata.

17. The non-transitory storage device of claim 15, wherein the instructions that cause the controller circuitry to encrypt the first memory page of the plurality of memory pages stored in the system memory circuitry using the first encryption method further cause the controller circuitry to:

encrypt the first memory page of the plurality of memory pages stored in the system memory circuitry using a Total Memory Encryption and integrity (TMEi) encryption method.

18. The non-transitory storage device of claim 17, wherein the instructions that cause the controller circuitry to encrypt the first memory page of the plurality of memory pages stored in the system memory circuitry using the first encryption method further cause the controller circuitry to:

encrypt the first memory page of the plurality of memory pages stored in the system memory circuitry using the Total Memory Encryption and integrity (TMEi) encryption method, wherein the first metadata includes Total Memory Encryption and integrity Message Authentication Codes (TMEi-MACs).

19. The non-transitory storage device of claim 15, wherein the instructions that cause the controller circuitry to encrypt the first memory page transferred from the system memory circuitry to the enclave memory circuitry using the second encryption method further cause the controller circuitry to:

encrypt the first memory page transferred from the system memory circuitry to the enclave memory circuitry using a Memory Encryption Engine (MEE) encryption method.

20. The non-transitory storage device of claim 19, wherein the instructions that cause the controller circuitry to encrypt the first memory page transferred from the system memory circuitry to the enclave memory circuitry using the second encryption method further cause the controller circuitry to:

encrypting, by the controller circuitry, the first memory page transferred from the system memory circuitry to the enclave memory circuitry using the Memory Encryption Engine (MEE) encryption method, wherein the second metadata includes Memory Encryption Engine counter data.

21. The non-transitory storage device of claim 20, wherein the instructions that cause the controller circuitry to encrypt the first memory page transferred from the system memory circuitry to the enclave memory circuitry using the second encryption method further cause the controller circuitry to:

encrypt the first memory page transferred from the system memory circuitry to the enclave memory circuitry using the Memory Encryption Engine (MEE) encryption method, wherein the second metadata further includes Memory Encryption Engine Message Authentication Codes.

* * * * *